June 30, 1970  E. V. BUNTING ET AL  3,517,943
UNIVERSAL WEIGHT TRANSFER HITCH
Filed July 1, 1968  4 Sheets-Sheet 1
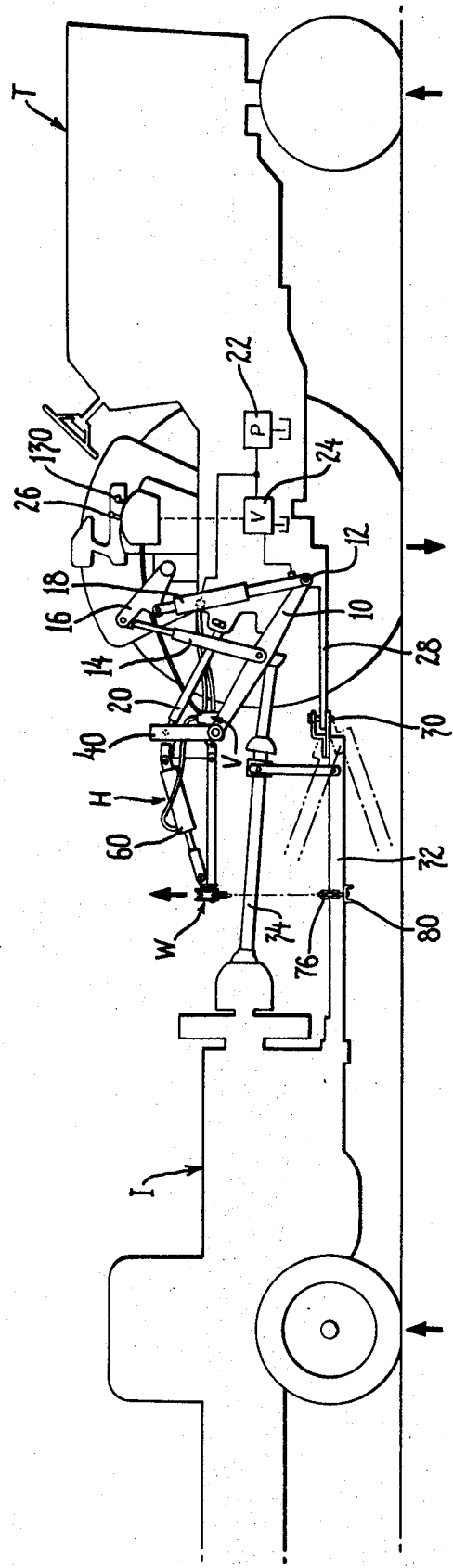
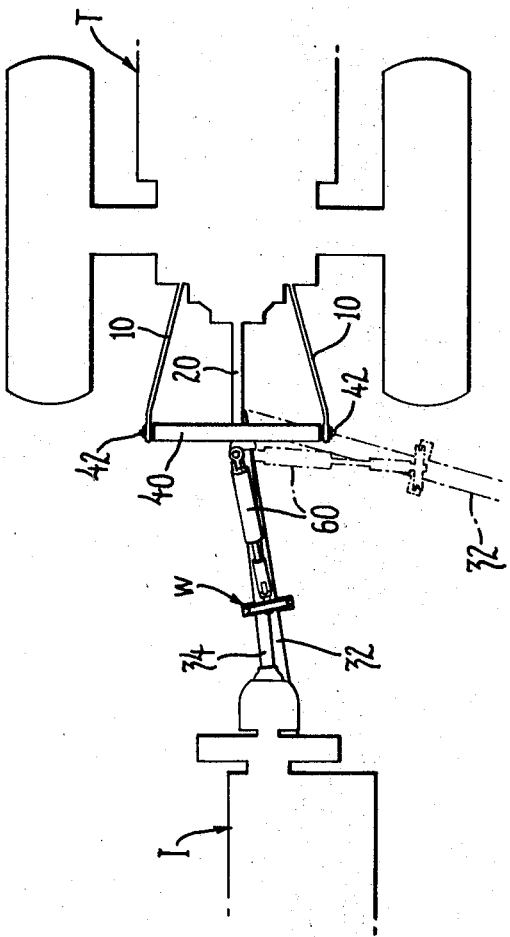
INVENTORS.
ERNEST V. BUNTING
BY  HANS V. LIND
Tweedale & Gerhardt
ATTORNEYS.

INVENTORS.
ERNEST V. BUNTING
BY HANS V. LIND

Tweedale & Gerhardt
ATTORNEYS.

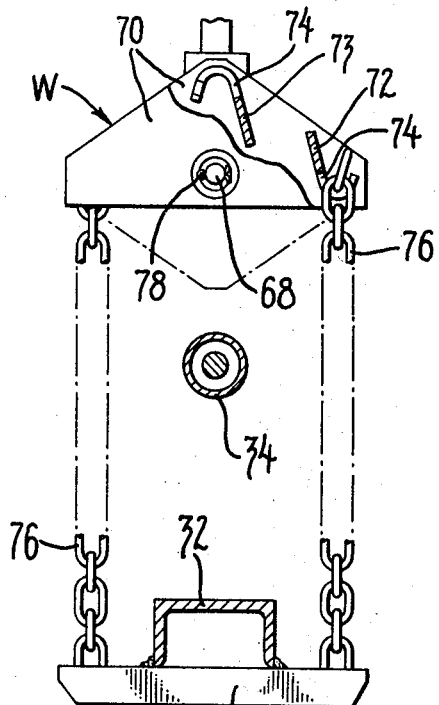
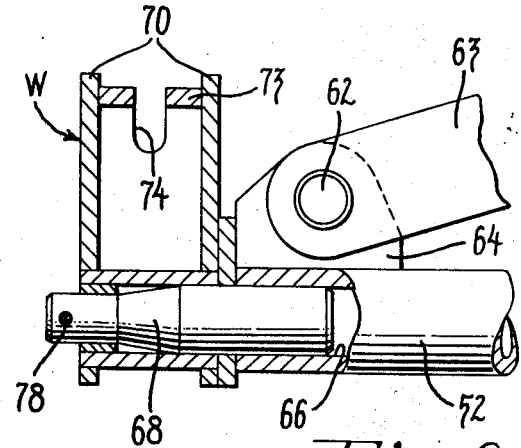
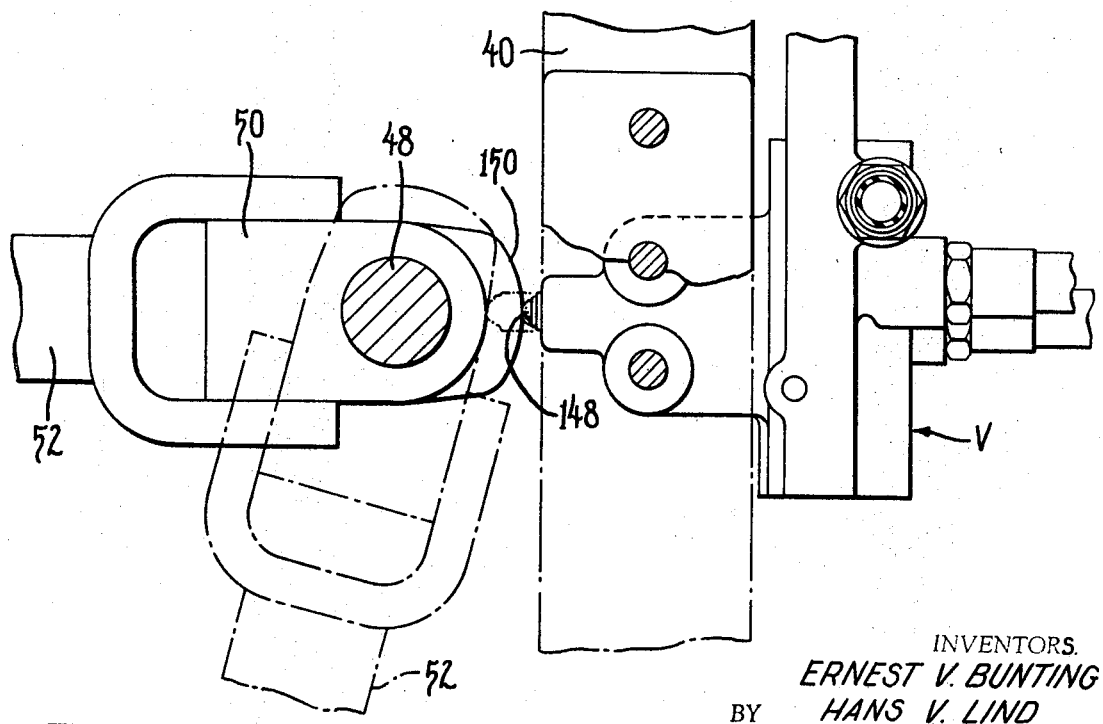

INVENTORS.
ERNEST V. BUNTING
BY HANS V. LIND

Tweedale & Gerhardt
ATTORNEYS.

United States Patent Office 3,517,943
Patented June 30, 1970

3,517,943
UNIVERSAL WEIGHT TRANSFER HITCH
Ernest V. Bunting, Detroit, and Hans V. Lind, Royal Oak, Mich., assignors to Massey-Ferguson Inc., Des Moines, Iowa, a corporation of Maryland
Filed July 1, 1968, Ser. No. 741,770
Int. Cl. B62d 53/00
U.S. Cl. 280—405                                      14 Claims

ABSTRACT OF THE DISCLOSURE

A hitch for transferring weight from an implement pulled by a vehicle by means of a drawbar and tongue. The hitch includes a swinging and elevating boom assembly attached to the rear of the vehicle. A weight transfer connection such as one or more chains connects the end of the boom assembly with the drawbar-implement to transfer weight. The boom assembly includes an expansible and retractable controllable load element such as a hydraulic cylinder supplied from a controllable variable pressure source, the controllable load element permits fore and aft pitching between the implement and tractor while maintaining a variable predetermined lifting force. The weight transfer can be controlled by pressure sensing or load sensing. Means can be provided for relieving the load on turning. Break-away means for disconnecting the weight transfer connection can also be provided.

---

This invention relates generally to hitch mechanisms for connecting implements and the like to vehicles, and is particularly concerned with a hitch that transfers a controlled amount of weight from the implement to the tractor during pitching and turning.

In order to increase the tractive effect of the drive wheels of vehicles such as tractors, there have been developed many varieties of hitches for transferring weight from an implement or other apparatus to a tractor which is carrying, pulling or carrying and pulling the implement.

The ideal aim of these hitches is to provide a means of transferring a variably set amount of weight from the implement to the tractor regardless of fore and aft pitching or lateral turning between the tractor and implement. Such a hitch should permit a relatively sharp turn and accommodate a relatively high pitching angle. The hitch should not interfere with any P.T.O. connection between the tractor and implement and should have universal application, or in other words, be usable on most any tractor with most any implement with the least amount of modification of the hitch, tractor or implement. The hitch should have a release provision in the event that the draft or pulling load is imposed on the hitch.

Several types of weight transfer hitches have been developed and used but none meet all of the ideal requirements set forth above. Some hitches are mounted on the conventional hitch linkage of the tractor and utilize the link lifting system to control the weight transfer and at the same time permit pitching between the tractor and implement. The raising and lowering of the lift links limits the use with a P.T.O. shaft or provides insufficient turning ange. Other hitches require special internal hydraulics in the tractor to sense and control the amount of weight being transferred. Still other hitches require special drawbar or tongue connections on the tractor, implement or both and are thus limited to use with specially designed equipment. Some hitches rely on dynamic implement soil forces for weight transfer and are limited to ground engaging moving conditions for weight transfer.

It is therefore an object of this invention to provide a weight transfer hitch assembly for a tractor-implement combination that is substantially univeral in application and can be used in a variety of different ways.

Figure 3:
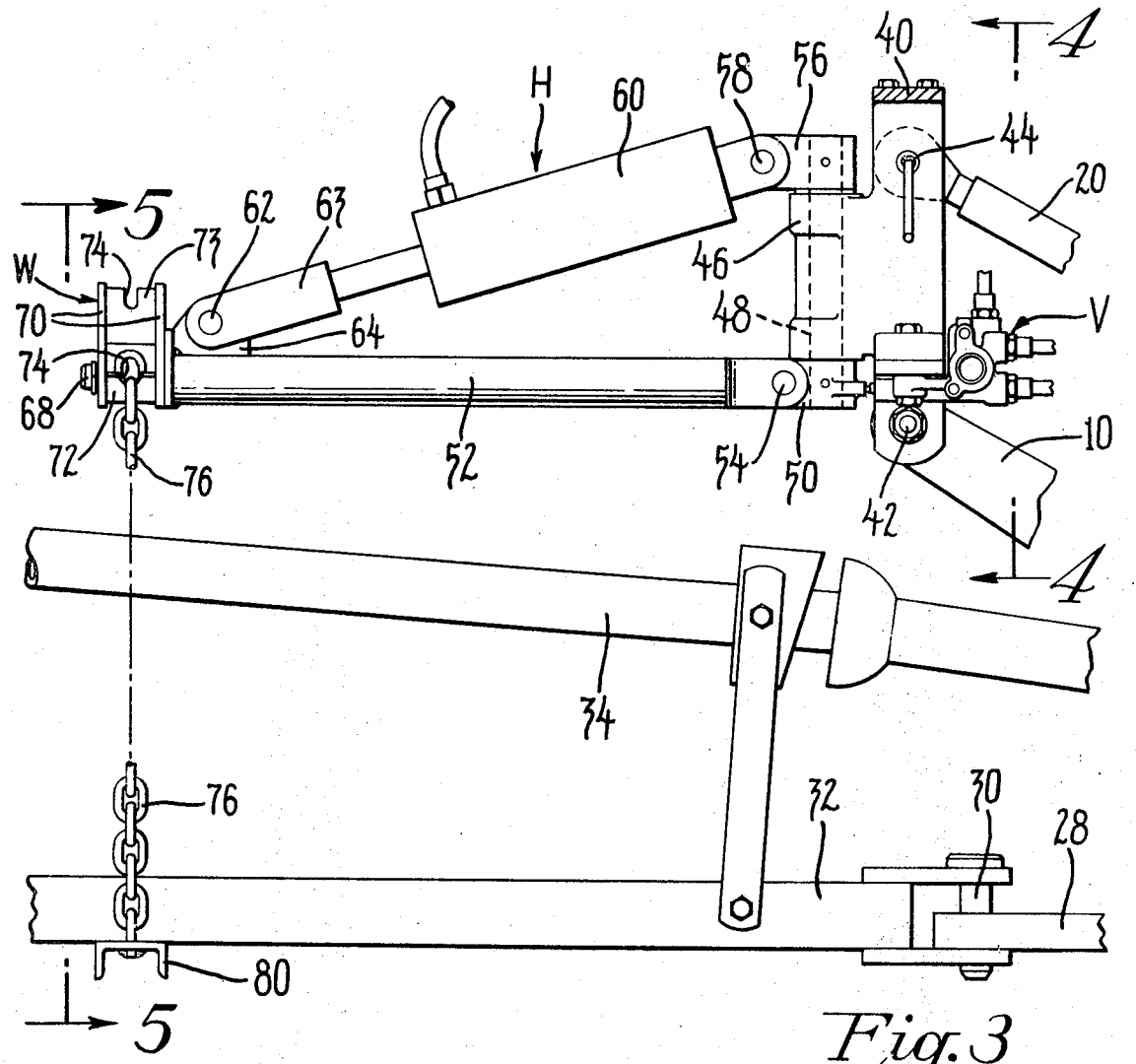
Figure 4:
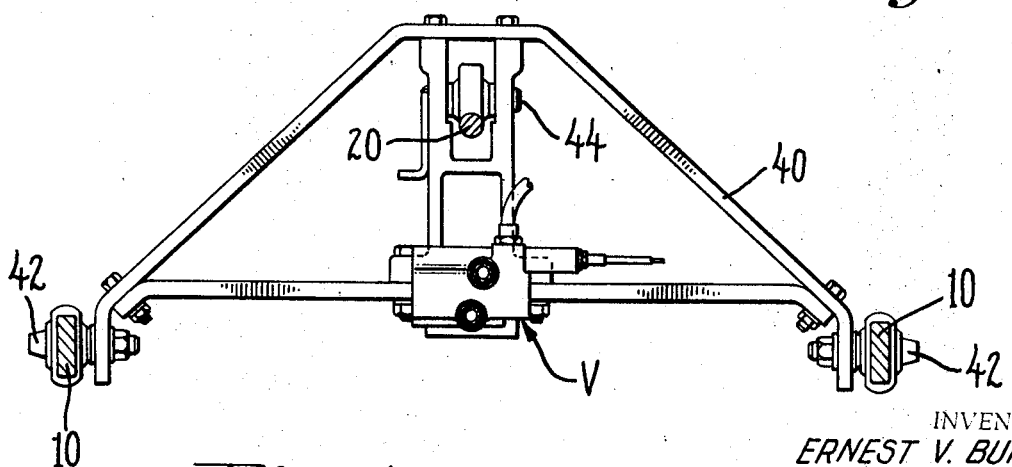
Figure 8:
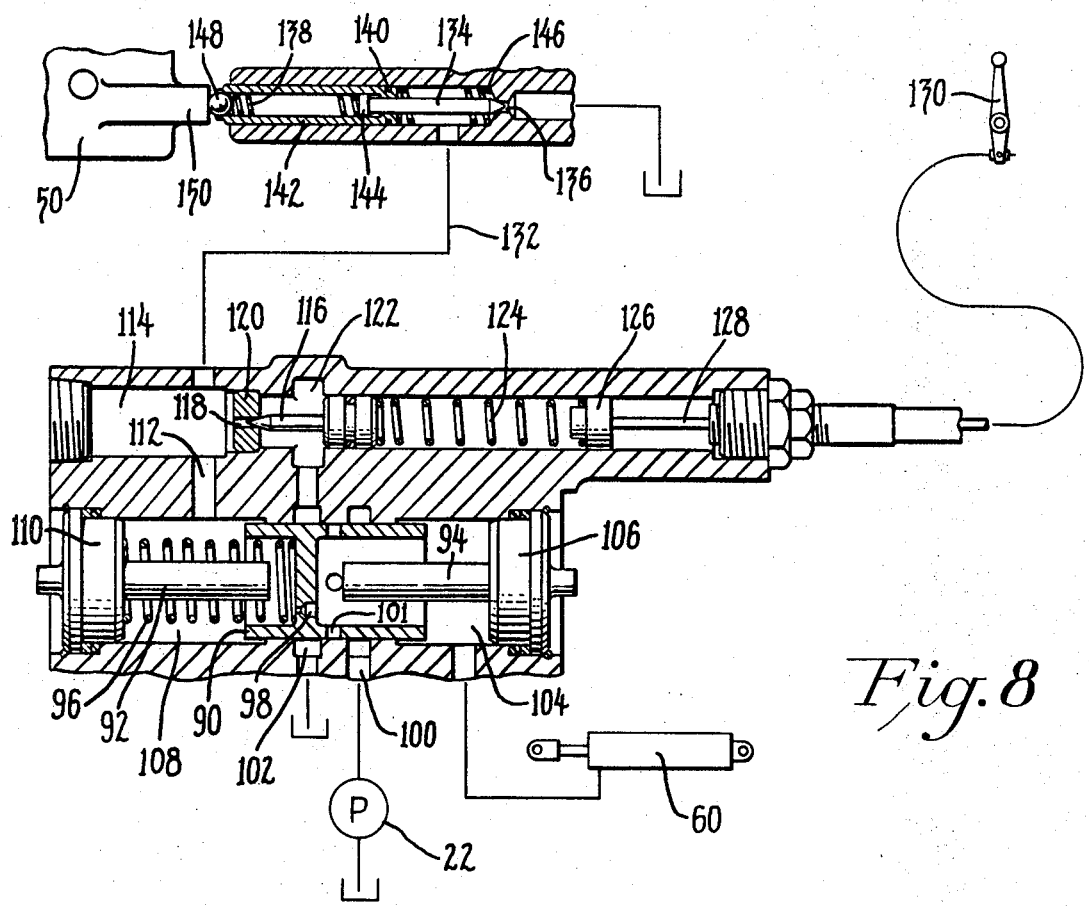
Figure 9:
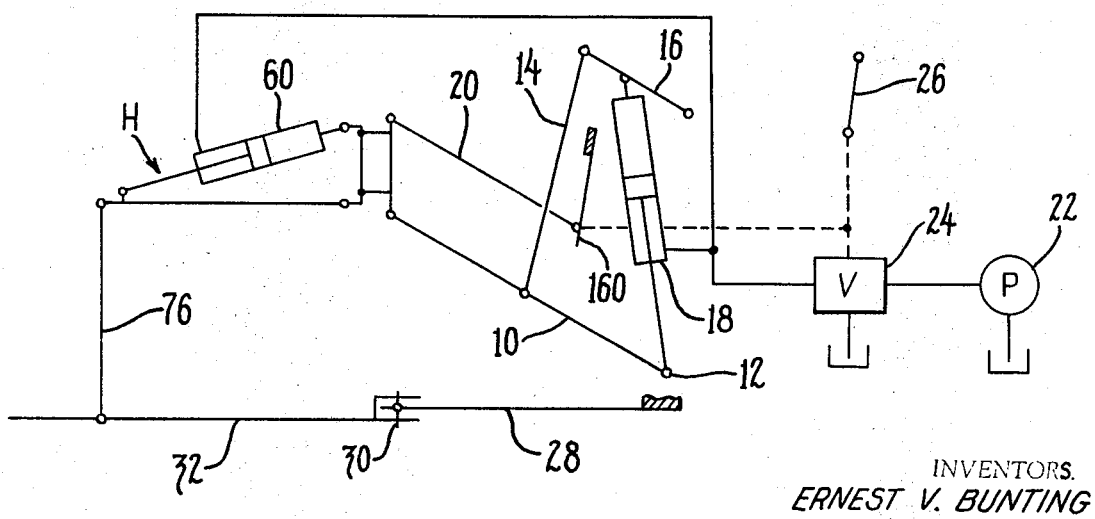

Other objects and advantages will be readily apparent from the following description and accompanying drawings in which:

FIG. 1 shows the hitch invention applied to a tractor-implement combination;
FIG. 2 shows a top view of the hitch of FIG. 1;
FIG. 3 is an enlarged view showing details of the hitch and drawbar arrangement;
FIG. 4 is a sectional view taken on the lines 4—4 of FIG. 3;
FIG. 5 is a sectional view taken on the lines 5—5 of FIG. 3;
FIG. 6 is an enlarged view showing certain details of the attachment of the weight carrying means to the hitch;
FIG. 7 is a detailed enlarged view showing a cam actuated valve incorporated in the hitch;
FIG. 8 is a schematic diagram showing a hydraulic control for the hitch including control valve shown in the combination of FIGS. 1–7; and
FIG. 9 is a schematic illustration of the invention applied to a tractor having internal hydraulic draft control.

Referring now to FIG. 1 which shows a tractor T connected to pull an implement I and wherein the weight transfer hitch H is mounted on the tractor to transfer weight from the implement to the tractor. In the arrangement shown in FIG. 1, the hitch H is mounted on a conventional three point hydraulically controlled linkage including a pair of laterally spaced lower links 10 which are pivotally mounted at 12 and which are raised and lowered by drop links 14 attached to lift arms 16. The lift arms 16 are raised by means of hydraulic cylinders 18, the lower ends of which are pivotally connected at 12 also.

The lift cylinders 18 are operated by pressure from a pump 22, the flow of which is controlled by a valve 24. Valve 24 may be actuated by conventional position control, draft control, or pressure control. The position and/or control of the links 10 would normally be controlled by a hand lever 26 and by changes in the position, draft or cylinder pressure as the case may be. With the application of the invention shown in FIG. 1 the links 10 and 20 would normally be in their highest or transport position as shown in the figure.

A drawbar 28 extends from the rear of the tractor and is pivotally connected at 30 to the implement drawbar 32. The pivot connection 30 not only permits lateral turning between the tractor and implement but also permits relative fore and aft pitching between the tractor and implement as shown in the dash lines in FIG. 1. The P.T.O. shaft 34 extends from the tractor and is connected to the implement I for operating the same. The implement may be any device to be pulled by a tractor such as a baler, a wagon, a pull type or semi-mounted plow, a wheel type disc harrow or any other apparatus whose weight is carried partially on the ground directly through wheels and partially by the towing tractor.

Mounted on the ends of the lower links 10 and upper link 20 is a swinging boom hitch shown in greater detail in FIGS. 3, 4 and 5. The hitch includes an A-frame member 40 having pins 42 and 44 which mount the frame member 40 on the ends of the lower links 10 and upper link 20. The frame member 40 includes a rearwardly extending trunnion portion 46 having a vertical bore therein and receiving a shaft 48. The shaft 48 extends above and below the portion 46 with the lower end having a bracket 50 secured thereto. A lower strut member 52 is connected to the bracket 50 by a horizontal pivot pin 54 and thus laterally swings with the shaft 48 but can pivot up and down relative thereto.

The top of shaft 48 has a bracket 56 secured thereto and carries a pivot 58 that secures one end of a hydraulic cylinder 60 to the bracket. The other end of the hydraulic cylinder 60 is pivotally connected at 62 to a bracket 64 welded or otherwise secured to the lower strut 52. The strut 52 has a bore 66 therein which receives cylindrical member 68 that forms a bearing for a weight transfer member generally indicated W (FIG. 6).

The cylindrical member 68 rotatably carries the weight transfer element which includes a pair of generally triangular-shaped plates 70 joined by spacer members 72. The spacer members 72 have notches 74 formed therein which are adapted to receive links of chains 76. Two of spacer members 72 are located on opposite sides of the members 68 so that slots 74 therein form chain receiving hooks for a pair of spaced chains as seen in FIG. 5, while a third spacer 73 located at the apex of the triangle serves as a chain receiving hook for a single chain when the element W is rotated 180° from the position shown in FIG. 5.

A pin 78 serves to hold the element W on the shaft 68 and also serves as a safety release in the event that there is a relatively high axial force on the element W relative to the hitch H and as will be explained in more detail below.

As shown in FIGS. 1, 3 and 5, the lower ends of chains 76 are secured to a cross piece 80 which extends below the tongue 32 of the implement I. The cross piece 80 may be secured to the tongue or it may be free to move relative thereto.

It will be obvious that with the hitch H and weight transfer element W mounted on the tractor and connected to the implement as shown in FIG. 1, hydraulic pressure in the cylinder 60 will tend to shorten the distance between pivots 62 and 58 and attempt to raise the weight transfer element W and the chains carried thereby relative to the tractor T. As was explained above, the normal hydraulic hitch elements 10 and 20 would be in their highest or transport position in the application of the invention as shown in FIG. 1. The lifting force exerted by the hitch H transfers weight from the implement I to the rear wheels of the tractor with the consequent reduction in weight on the front wheels of the tractor. This weight transfer is obviously desirable in order to increase the relative effort of the tractor necessary during operation under conditions where the wheels would slip if only the normal weight of the tractor was carried by the wheels.

It should be noted that the shaft 48 which permits the hitch to laterally swing about the axis of the shaft 48, is relatively close to the pivot axis of the drawbar and tongue connection 30 and that therefore the hitch H swings about approximately the same axis as the implement itself so that the chains 76 remain relatively vertical during turning and hence do not cause any substantial additional lifting effect during turns as would be the case if the hitch H and implement I were turning about substantially spaced vertical axes.

It would also be obvious that if the pressure in the cylinder 60 is constant there will be constant lifting force or weight transfer even thought the tractor and implement or pitched relative to each other. A constant pressure in cylinder 60 can be achieved in a number of ways. The arrangement shown in FIG. 1 has a valve body assembly V which contains not only a pressure control valve system but includes a special valve that acts to reduce the pressure in the cylinder 60 during sharp turns.

FIG. 8 shows the details of the pressure control valve V. In a first bore of the valve body is a sleeve valve 90 that is centrally located between two stop members 92 and 94. The valve 90 is urged by a spring 96 to the right of FIG. 8 and has an orifice 98 formed therein permitting a controlled flow of oil from one side of the valve member 90 to the other. The valve includes an inlet port 100 which is connected by a hose or other means to the pump 22 on the tractor while a groove 102 connects through an exhaust port to an oil sump.

The chamber 104 formed between the valve member 90 and an end plug 106 is connected by a port and conduit means to the cylinder 60. Thus, whatever pressure exists in chamber 104 also exists in cylinder 60. The chamber 108 formed between the left end of the valve 90 and a plug 110 is connected through a passage 112 to a chamber 114. A needle valve 116 seats in an aperture 118 formed in a plug member 120 and acts to control the flow of oil from the chamber 114 into the chamber 122 which is connected to the exhaust valve port 102. The needle valve 116 is biased into a closed position by a spring 124 whose biasing force can be adjusted by a spring seat 126 moved back and forth by a bowden wire 128 connected to a lever 130 mounted on the tractor console.

The chamber 114 is also connected by a passage 132 to a turn control valve including a needle valve member 134 that seats in an aperture 136 leading to the oil sump. The needle valve 134 is normally biased by spring 138 into a closed position but can be moved to the left as seen in FIG. 8 by a shoulder 140 formed in a sleeve 142 engaging with an enlarged head portion 144 on the valve 134. The sleeve 142 is biased to the left by a spring 146 that is stronger than the spring 138. The position of the sleeve 142 is controlled by a ball member 148 that runs on a cam surface 150 formed on the bracket 50 secured to the lower end of the shaft 48.

The center 80° portion of the cam surface 150 is formed as a circle about the center of the shaft 48 however, there is a rather abrupt change in the curve of the surface 150 such that upon turning of the hitch more than 40° from the center position, the sleeve 142 and ball 148 will move sufficiently to the left, as seen in FIGS. 7 and 8, to cause the valve 134 to open to connected line 132 to the oil sump.

Referring again to the pressure control valve 90 it will be seen that when the valve 90 is moved to the right by the spring 96 the inlet port 100 will connect through an aperture 101 to the chamber 104 and pressurize same and simultaneously direct pressure to the cylinder 60. At the same time a controlled amount of oil will pass through the restriction 98 into chamber 108. When the pressure in chamber 108 and the connected chamber 114 reaches a value sufficient to open the needle valve 116 against the force of the adjustable spring 124, the pressure in 108 will stabilize and will remain constant unless the force of spring 124 is adjusted by the handle 130 or unless the turn control valve 134 opens as during as sharp turn. The pressure in chamber 104 will increase to move the valve 90 to the left against the force of the spring 96 and the pressure in chamber 108 until the inlet port 100 is cut off from the aperture 101. If the pressure in cylinder 60 should increase still further the pressure in 104 will cause the valve 90 to move to the left and connect the aperture 101 to the relief port 102. It will be seen that the valve 90 will move back and forth to connect the aperture 101 with the inlet port 100 or the outlet port 102 to maintain a pressure in the cylinder 60 in proportion to the pressure in chamber 114, which pressure in turn is controlled by the position of handle 130.

As explained above, during a sharp turn the valve 134 will open causing the pressure in chamber 114 and chamber 108 to drop permitting the pressure in the cylinder 60 to act in chamber 104 to move the valve 90 to the left connecting the relief port 102 to the cylinder and thus lower the pressure.

While the pressure control valve V has been shown formed as part of the hitch assembly, this valve could be located remote from the hitch, especially if the turning valve control of the pressure was not needed. The purpose of relieving the pressure and weight transfer on sharp turns is that the weight is transferred more to one wheel than the other and in a very sharp turn almost all of the weight will be on the inside wheel. This could cause that wheel to dig in while the other wheel with a lower weight thereon slipped. The automatic turn valve can be eliminated, and when necessary during a sharp turn, the operator can manually cause the pressure to lower by moving lever 130 and cause the pressure to raise again after the turn is completed.

In the event that the tractor drawbar 28, the connection 30 or the implement tongue 32 should fail or come loose the pulling force of the tractor could be transferred to the hitch H and chains 76. Since this would be highly undesirable the pin 78 has been designed to shear if the axial load between the weight transfer element W and the boom assembly exceeds the load carrying capacity of the pin. With the pin sheared, the element W will drop off the end of the shaft 68 completely freeing the tractor from a pulling load.

If the tractor has an internal hydraulic system that can supply a controllable constant pressure then the cylinder 60 could be connected directly to that system and the external valve V would not be needed.

It would also be possible to use the hitch on a tractor having double acting draft control either of the type wherein the load in the top link or the load in the bottom links is used to control the raising and lowering of the linkage. The invention is shown on a top link control tractor in FIG. 9 which schematically shows an implement-hitch-tractor. The top link 20 is connected to a spring member 160 that resists movement of link 20 in either forward or reverse direction and hence provides a means whereby the deflection of the spring and/or link can be used to control the control valve 24 to connect or disconnect the pump with the cylinder 18 and the cylinder 60 which are connected in parallel. As shown, the weight transferred to the tractor from the implement will place the link 20 in tension and deflect springs 160. The valve 24 will move to maintain the deflection of spring 160 at a constant valve depending on the setting of lever 26. The weight transfer possible by the arrangement of FIG. 9 is limited by the capacity of spring 160 however the linkage geometry and/or spring could be modified to obtain whatever weight transfer is desired. In many cases, therefore, the hitch could be directly mounted on a tractor having draft control and no other provision for variable pressure control would be needed.

In the FIG. 1 and FIG. 9 arrangement the hitch H is mounted on the three point linkage of a tractor. It is also possible to mount the hitch H on the tractor by suitable brackets or other means since the normal raising and lowering of a lift system is not required with this invention. Whenever the hitch is used mounted on the tractor linkage, the size of cylinder 60 must be chosen so that it not only will carry whatever load is necessary at the pressure available but where the cylinder 60 is connected in parallel with the lift cylinder 18 as in FIG. 9, the size must be small enough to insure that the links 10 and 20 will remain in transport position during a weight transfer operation. This insures that the links will not interfere with the P.T.O. on turns. A positive mechanical lock can also be used to hold the links in transport.

The weight transfer element W is adaptable to use two chains which straddle at P.T.O shaft as shown in FIG. 5 and can be turned over to use a single chain when no P.T.O. is required or where the tongue is offset from the P.T.O. shaft as is sometimes the case with a baler during both field and transport operations.

During operation oil can flow into and out of cylinder 60 allowing the upper leg of the triangle forming the swinging boom to shorten or lengthen. As long as the pressure remains constant the lifting force or weight transfer will remain constant at a value adjusted by setting of the pressure or as in the case of the FIG. 9 application, the setting of the spring deflection.

It will be seen that the invention is relatively simple to construct, can be adapted and attached to a variety of tractors and implements and will provide a safe, easily adjustable manner of obtaining weight transfer, from such implement, to the pulling tractor.

We claim:
1. A weight transfer hitch for transferring weight from a tongue type puller implement to a tractor having a drawbar for connecting the tractor to the implement tongue, said hitch including a frame member adapted to be mounted on the rear of the tractor, a swinging boom assembly including a pair of longitiudinal elements pivotally connected together at one end and each pivotally connected at its other end to said frame for up and down pivotal movement about vertically spaced transverse horizontal axes and for lateral swinging about a common vertical axis, one of said elements including an extensible and retractable load transfer means, weight transfer means connected at one end to said boom adjacent the common pivot connection between said elements and adapted at its other end to be connected to the tongue of the implement, and means for maintaining the load carried by said load transfer means substantially constant during vertical pivotal movement of said elements relative to said frame.

2. The combination of a tractor and pulled implement connected to the tractor by a tongue and drawbar, a weight transfer hitch for transferring weight from the tongue to the tractor, said hitch including a frame member mounted on the tractor, a swinging boom assembly including a pair of longitudinal elements pivotally connected together at one end and each pivotally connected at its other end to said frame for both up and down pivotal movement about vertically spaced transverse horizontal axes and for lateral swinging about a common vertical axis, one of said elements including an extensible and retractable load transfer means, weight transfer means connected at one end to said boom adjacent the common pivot connection between said elements and at its other end connected to the tongue of the implement, and control means for maintaining the load carried by said load transfer means substantially constant during vertical pivotal movement of said elements relative to said frame.

3. The combination of claim 2 wherein said load transfer means comprises jack means including relatively reciprocable piston and cylinder elements, and wherein said control means comprises means automatically controlling relatively reciprocation of said elements during relative pivotal movement of said boom and said tractor.

4. The combination of claim 2 wherein said tongue and drawbar are connected on a vertical pivot axes relatively close to the common vertical axis on which said elements are pivotal on said frame and wherein said tongue and drawbar connection permits relative vertical pivotal movement of said tractor and implement about a transverse horizontal axis.

5. The combination of claim 2 wherein said weight transfer means comprises at least one chain connected to the end of said boom and to the tongue.

6. The combination of claim 2 wherein the weight transfer means connection to said boom includes release means automatically disconnecting the same in the event that a longitudinal horizontal force greater than a predetermined value is transmitted through said connection.

7. The combination of claim 6 wherein said release means comprises a shear pin connection between said weight transfer means and said boom.

8. The combination of claim 2 wherein said weight transfer means comprises a first horizontally extending beam member pivotally mounted at its center on said boom assembly on a horizontal longitudinal axis, a second horizontally extending beam member extending under said implement tongue and a pair of spaced chains connecting the ends of the first beam with the ends of said second beam, the space between said chains and said beams providing an unrestricted space for a power take off shaft extending between said tractor and said implement.

9. The combination of claim 2 wherein said weight transfer means comprises a generally triangular shaped beam pivotally mounted at its center on said boom assembly on a longitudinal axis, said beam having a plurality of chain attaching points thereon for connecting said boom assembly to said implement tongue by a pair of spaced chains or alternatively by a single chain.

10. The combination of claim 3 wherein said tractor has a three point linkage including a pair of vertically movable lower draft links and an upper link, said frame mounted on the ends of said links for movement therewith.

11. The combination of claim 3 wherein said control means for maintaining the load carried by said load transfer means substantially constant during vertical pivotal movement comprises a source of fluid under pressure, valve means for connecting said cylinder to said source or to exhaust, said valve means responsive to changes in pressure in said jack means for controlling said valve to maintain a constant pressure in said cylinder and manual means for adjusting the cylinder pressure maintained by said valve means.

12. The combination of claim 10 wherein said control means for maintaining the load carried by said load transfer means substantially constant during vertical pivotal movement comprises spring means for sensing loads in one of said links, a supply of fluid under pressure, valve means for controlling the pressure in said jack means, said valve means responsive to changes in the load in said one link to maintain said load at constant value and manual means for adjusting the value of said constant load.

13. The combination of claim 3 wherein means are provided to automatically reduce the load carried by said load transfer means upon predetermined angle of turn between said tractor and implement.

14. The combination of claim 13 wherein said means comprises a cam operated valve operable to reduce the pressure in said jack means upon said predetermined angle of turn.

References Cited

UNITED STATES PATENTS

| | | | |
|---|---|---|---|
| 3,062,561 | 11/1962 | Wulff et al. | 280—405 |
| 3,073,622 | 1/1963 | Merritt | 280—405 |
| 3,241,862 | 3/1966 | Bunting | 280—405 X |
| 3,275,084 | 9/1966 | Bunting | 172—9 |
| 3,347,560 | 10/1967 | Hodges et al. | 280—405 |
| 3,430,984 | 3/1969 | Richardson | 280—405 |
| 3,447,816 | 6/1969 | Shannon | 172—7 X |
| 3,463,510 | 8/1969 | Van Syoc | 280—405 |

LEO FRIAGLIA, Primary Examiner

U.S. Cl. X.R.

172—7, 9